(12) United States Patent
Neuendorffer

(10) Patent No.: US 10,671,779 B1
(45) Date of Patent: Jun. 2, 2020

(54) FUNCTION CALLS IN HIGH LEVEL SYNTHESIS

(71) Applicant: Xilinx, Inc., San Jose, CA (US)

(72) Inventor: Stephen A. Neuendorffer, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/030,686

(22) Filed: Jul. 9, 2018

(51) Int. Cl.
*G06F 30/327* (2020.01)

(52) U.S. Cl.
CPC .................................. *G06F 30/327* (2020.01)

(58) Field of Classification Search
CPC .................................................... G06F 30/327
See application file for complete search history.

(56) References Cited

U.S. PATENT DOCUMENTS

| 6,021,266 | A  | * | 2/2000  | Kay     | G06F 17/5045 716/103 |
|-----------|----|---|---------|---------|----------------------|
| 6,996,799 | B1 | * | 2/2006  | Cismas  | G06F 17/5045 703/14  |
| 9,449,131 | B2 | * | 9/2016  | Han     | G06F 17/5045         |
| 9,710,584 | B1 |   | 7/2017  | Hao et al. |                   |
| 2007/0294075 | A1 | * | 12/2007 | Ganesan | G06F 17/5027 703/23 |
| 2013/0125097 | A1 | * | 5/2013  | Ebcioglu | G06F 17/5045 717/136 |
| 2015/0020043 | A1 | * | 1/2015  | Ravindran | G06F 8/34 717/105 |
| 2015/0347654 | A1 | * | 12/2015 | Han     | G06F 17/5045 716/102 |
| 2017/0004246 | A1 | * | 1/2017  | Berry   | G06F 17/5081         |

OTHER PUBLICATIONS

Vito Giovanni Castellana et al., "An Automated Flow for the High Level Synthesis of Coarse Grained Parallel Applications", 2013, IEEE, pp. 294-301. (Year: 2013).*
Possignolo et al., "Fluid Pipelines: Elastic Circuitry meets Out-of-Order Execution", 2016, IEEE, pp. 233-240. (Year: 2016).*

(Continued)

*Primary Examiner* — Stacy Whitmore
(74) *Attorney, Agent, or Firm* — Kevin T. Cuenot

(57) ABSTRACT

A method of high level synthesis may include detecting in an application, using computer hardware, a first function including a first call site for a second function and a second call site for the second function, determining, using the computer hardware, that the first call site and the second call site each pass different data to the second function and each receive different return data from the second function, and generating, using the computer hardware, a circuit design from the application including a circuit block implementing the second function and multiplexer circuitry. The multiplexer circuitry may be configured to coordinate passing of data to the circuit block from a first source circuit corresponding to the first call site and a second source circuit corresponding to the second call site, with handshake signals exchanged between the circuit block, the first source circuit, and the second source circuit.

20 Claims, 7 Drawing Sheets

(56) References Cited

OTHER PUBLICATIONS

Edwards et al., Compositional Dataflow Circuits, In Proceedings of the International Conference on Formal Methods and Models for Codesign (MEMOCODE), pp. 1-10, Sep. 29-Oct. 2, 2017, Vienna, Austria.

Josipović et al., "Dynamically Scheduled High-level Synthesis," Session 4: High Level Synthesis 1, In ACM Proceedings of the 2018 ACM/SIGDA International Symposium on Field-Programmable Gate Arrays, FPGA'18, Feb. 25-27, 2018, pp. 127-136, Monterey, CA USA.

Tan et al., "Elasticflow: A Complexity-Effective Approach for Pipelining Irregular Loop Nests," In Proceedings of the IEEE/ACM International Conference on Computer-Aided Design 2015, Nov. 2, 2015, pp. 78-85.

Cortadella, et al., "Synthesis of Synchronous Elastic Architectures", DAC 2006, Jul. 24-28, 2006, San Francisco, California, USA.

\* cited by examiner

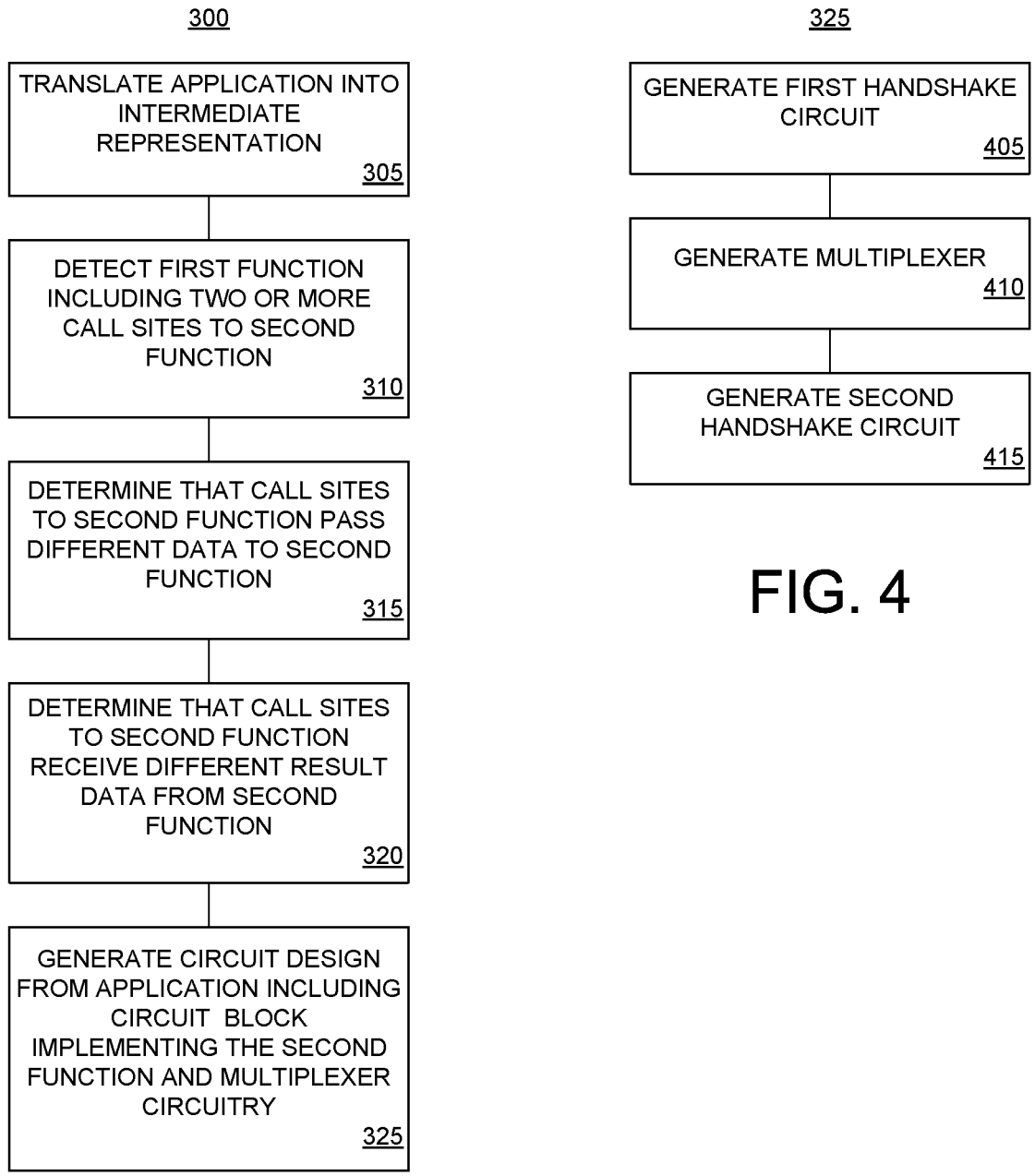

FUNCTION CALLS IN HIGH LEVEL SYNTHESIS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to computer aided design of integrated circuits and, more particularly, to implementing circuit designs using high level synthesis.

BACKGROUND

High-level synthesis or "HLS" is a computer-automated design process in which a description of desired behavior of a system is converted into a circuit design and/or circuitry. The description of the desired behavior is typically written as an application in a high-level programming language such as C, C++, OpenCL, and so forth. The application may be translated into a circuit design that may be specified as a register transfer level (RTL) description. The circuit design describes a synchronous digital circuit in terms of the flow of digital signals between hardware registers and the operations performed on those signals. The circuit design may be processed (e.g., synthesized, placed, and routed) through a design flow. Further, the processed circuit design may be implemented within an integrated circuit.

HLS is often used to hardware accelerate executable program code. For example, rather than executing a particular function as software using a central processing unit (CPU) or other processor capable of executing program code, the function may be implemented as a dedicated circuit also referred to as a hardware accelerator. While hardware acceleration often results in faster systems, some disadvantages do exist. In some cases, for example, certain code structures and/or coding techniques used in applications are not supported by HLS systems. Use of such structures and/or techniques may prevent the HLS system from transforming the application into hardware.

In other cases, as more functions are hardware accelerated, getting multiple hardware accelerators to interact with one another in an efficient manner can be difficult. HLS systems do attempt to combine multiple hardware accelerators together into a larger system. In doing so, however, the HLS systems often rely on a worst-case analysis of data dependencies among the hardware accelerators. This can result in inefficient circuit architectures.

SUMMARY

In one or more embodiments, a method of high level synthesis (HLS) may include detecting, in an application, using computer hardware, a first function including a first call site for a second function and a second call site for the second function, determining, using the computer hardware, that the first call site and the second call site each pass different data to the second function and each receive different return data from the second function, and generating, using the computer hardware, a circuit design from the application including a circuit block implementing the second function and multiplexer circuitry. The multiplexer circuitry may be configured to coordinate passing of data to the circuit block from a first source circuit corresponding to the first call site and a second source circuit corresponding to the second call site, with handshake signals exchanged between the circuit block, the first source circuit, and the second source circuit.

In one or more embodiments, a method of HLS may include detecting, in an application, using computer hardware, a first function including a first call site for a second function and a second call site for the second function, determining, using the computer hardware, that the first call site and the second call site each pass different data to the second function and each receive different return data from the second function, and determining, using the computer hardware, that the second function includes a third function. The method may also include generating, using the computer hardware, a circuit design from the application, wherein the circuit design includes a first circuit block implementing the second function, a second circuit block implementing a further instance of the second function, a third circuit block implementing the third function, and multiplexer circuitry. The third circuit block may be implemented independently of the first circuit block and the second circuit block. The multiplexer circuitry may be configured to coordinate passing of data to the third circuit block from the first circuit block and the second circuit block with handshake signals exchanged between the first circuit block, the second circuit block, and the third circuit block.

In one or more embodiments, a method of HLS may include detecting in an application, using computer hardware, a first function including a first call site for a second function, determining, using the computer hardware, that the second function is passed to the first function as a reference, and generating, using the computer hardware, a circuit design from the application including a circuit block implementing the first function. The circuit block may be configured to provide handshake signals from the circuit block to a module corresponding to the second function.

In one or more embodiments, a system includes a memory configured to store program code and a processor coupled to the memory. The processor, in response to executing the program code, is configured to initiate operations as described within this disclosure.

In one or more embodiments, a computer program product includes a computer readable storage medium having program code stored thereon. The program code is executable by a processor to perform operations as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates an example method of high level synthesis (HLS).

FIG. 4 illustrates an example implementation of block 325 of FIG. 3.

DETAILED DESCRIPTION

Figure 1:
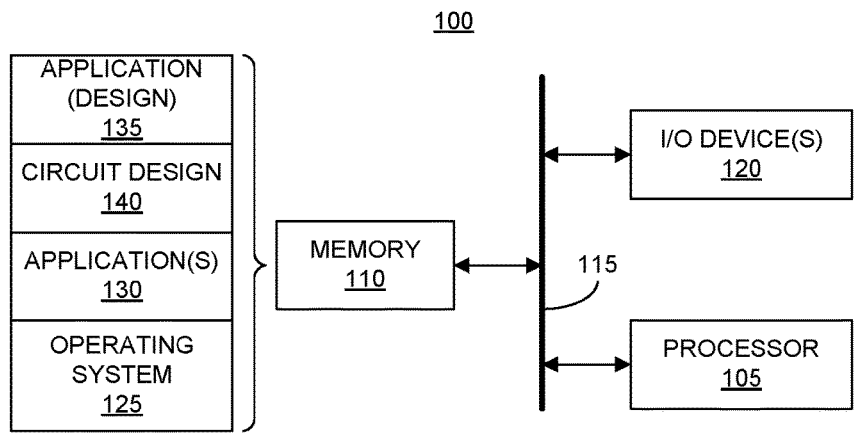
FIG. 1 illustrates an example of a data processing system for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer aided design of integrated circuits (ICs) and, more particularly, to implementing circuit designs using high level synthesis (HLS). HLS is a computer-automated design process that converts a description of behavior of a digital system into a circuit design. The description is often specified as an application using a high-level programming language (HLL). The circuit design generated from the description may be specified as a register transfer level (RTL) description. The resulting circuit design, when implemented, is functionally equivalent to the description (e.g., the application from which the circuit design is created).

Traditionally, hardware accelerators were used largely for performing digital signal processing (DSP) oriented operations. These DSP operations were characterized by large workloads with known computational structures that lent themselves to static analysis. Operations such as filters, Fast Fourier Transforms (FFTs), and the like have known data flow characteristics. HLS systems can apply static analysis to such applications to achieve an accurate picture of data flows for purposes of generating a hardware architecture.

In other applications, such as those used in modern data centers, the workloads and data structures operated on by hardware accelerators tend to be dynamic and data-driven. These types of applications do not lend themselves to static analysis. Trying to apply static analysis to such applications for hardware acceleration may result in the HLS system applying an already conservative approach that relies on a worst-case analysis of data flows to applications in cases where static analysis is already unlikely to accurately characterize data flows. To the extent an HLS system is able to generate a circuit architecture, such circuit architectures may be overly conservative and/or inefficient.

In accordance with the inventive arrangements described within this disclosure, handshake signaling may be used to implement circuit architectures that incorporate hardware accelerators. Use of handshake signaling allows an HLS system to utilize dataflow design techniques to combine accelerators within a larger circuit or system. Rather than relying upon a worst-case analysis of data dependencies of the application, control of hardware accelerators and interoperability among hardware accelerators may be controlled using handshake signaling. Using the embodiments described herein, an HLS system is capable of implementing hardware architectures that dynamically arbitrate among the data flows (e.g., different portions of hardware accelerated program code).

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example system 100 for use with one or more embodiments described herein. System 100 is an example of computer hardware that may be used to implement a computer, a server, a portable computer such as a laptop or a tablet computer, or other data processing system. A system or device implemented using computer hardware is capable of performing the various operations described herein relating to processing an application to create a circuit design for implementation within an IC.

In the example of FIG. 1, system 100 includes at least one processor 105. Processor 105 is coupled to memory 110 through interface circuitry 115. System 100 is capable of storing computer readable instructions (also referred to as "program code") and data within memory 110. Memory 110 is an example of computer readable storage media. Processor 105 is capable of executing the program code accessed from memory 110 via interface circuitry 115.

Memory 110 may include one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory.

System 100 may also include one or more cache memories (not shown) that provide temporary storage of at least some program code to reduce the number of times program code must be retrieved from a bulk storage device during execution.

Memory 110 is capable of storing program code and/or data. For purposes of illustration, memory 110 stores an operating system 125 and one or more application(s) 130. Operating system 125 and application(s) 130 may be stored as executable program code. In one or more embodiments, application(s) 130 include an electronic design automation (EDA) application. The EDA application is capable of performing HLS on an application 135 to generate a circuit design 140. Application 135 may be specified using a high-level language (HLL) such as C, C++, or other programming and/or scripting language. For example, application 135 may be specified as one or more source code files. Circuit design 140 may be specified as an RTL description. The RTL description may be specified using a hardware description language (HDL).

The EDA application may also perform one or more operations of a design flow (e.g., synthesis, placement, routing, and/or bitstream generation) on circuit design 140 to implement circuit design 140 within a target IC. The target IC may have an architecture the same as or similar to the architecture described in connection with FIG. 12.

System 100, e.g., processor 105, is capable of executing operating system 125 and application(s) 130 to perform the operations described within this disclosure. As such, operating system 125 and application(s) 130 may be considered an integrated part of system 100. Further, it should be appreciated that any data used, generated, and/or operated upon by system 100 (e.g., processor 105) are functional data structures that impart functionality when employed as part of the system.

Examples of interface circuitry 115 include, but are not limited to, a system bus and an input/output (I/O) bus. Interface circuitry 115 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

System 100 further may include one or more I/O devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

System 100 may include fewer components than shown or additional components not illustrated in FIG. 1 depending upon the particular type of device and/or system that is implemented. In addition, the particular operating system, application(s), and/or I/O devices included may vary based upon system type. In some embodiments, the functionality of operating system 125 and application(s) 130 may be combined into unified application, for example. Further, one or more of the illustrative components may be incorporated into, or otherwise form a portion of, another component. For example, a processor may include at least some memory. System 100 may be used to implement a single computer or a plurality of networked or interconnected computers each implemented using the architecture of FIG. 1 or an architecture similar thereto.

In one or more embodiments, system 100 operates on application 135. System 100, for example, may analyze the source code of application 135, detect particular constructs within the source code, and perform compilation to generate circuit design 140 based on the constructs detected within application 135. In one or more embodiments, system 100 may generate an intermediate representation (IR) of application 135. For example, system 100 may translate application 135 into an IR as part of compilation and perform the analysis and further compilation and/or translation on the IR to generate hardware (e.g., circuit design 140). In any case, circuit design 140 has a hardware architecture that is determined based, at least in part, on the detected constructs within application 135 or the IR thereof.

An IR is a data structure or code used internally by a compiler or virtual machine to represent source code. An IR is designed to be conducive for further processing, such as optimization and translation. A "good" IR is, in general, accurate in that the IR is capable of representing the source code without loss of information and independent of any particular source or target language. The IR may use a static single assignment (SSA) compliant form. Examples of IRs include, but are not limited to, stack machine code, two address code, three address code, and/or a graph data structure. Other examples of intermediate representations include, but are not limited to Low Level Virtual Machine (LLVM) IR and GNU Compiler Collection (GCC) IR.

The inventive arrangements described within this disclosure are capable of evaluating application 135 and generating circuit design 140 with a hardware architecture that is capable of operating in a more efficient manner than other hardware architectures generated by conventional HLS systems. System 100 is capable of achieving an improved quality of result (QOR) compared to other conventional implementation techniques. The QOR may be realized through physical synthesis such as placement and/or routing.

Many conventional HLS systems attempt to generate a circuit architecture that relies upon a state machine to control data flows. The state machine must have the appropriate number of states and ordering of states to account for all of the possible data flow scenarios that may arise in the hardware. As such, the state machine itself must be predetermined and is often complex. The larger the number of signals in the circuit design that the state machine is to take into consideration, the larger the state machine implementation. This often means that the state machine, which is typically implemented as a centralized circuit block, has more circuitry to be placed, more signals to be routed, and longer signal paths to route. As such, the state machine often causes greater congestion and overall contention for resources of the target IC. This can increase runtime of the EDA system for purposes of placement and routing. The state machine also tends to become a timing bottleneck in the resulting hardware.

The inventive arrangements described herein utilize handshake signaling which does not rely upon worst case timing analysis thereby increasing speed of operation of the circuit design and/or resulting hardware. Further, the data flows may be controlled through handshake signaling using compact and distributed hardware that allows the circuit design and resulting hardware to operate faster than would otherwise be the case. The embodiments described herein also provide improved QOR by reducing the wirelength of the resulting hardware and reducing the amount of resources of the target IC needed to control the data flows.

The inventive arrangements described within this disclosure are also capable of providing improved operation of the implementation tools, e.g., system 100 itself. System 100, for example, is capable of performing the operations necessary for implementation of circuit design 140, e.g., placement and/or routing, in less time than would otherwise be the case had the operations described herein not been performed. Thus, the inventive arrangements support faster execution and operation of system 100 while performing various stages of a design flow such as placement and/or routing.

Example 1 illustrates source code that may be processed by a system such as system 100 described in connection with FIG. 1. The source code of Example 1 may be part of an application such as application 135 of FIG. 1.

Example 1

```
F( ) {
   G(A);
   G(B);
}
```

The source code in Example 1 includes a function F. The function F includes two call sites G(A) and G(B) each invoking the function G. A "call site" of a function or subroutine is the location (line of code) where the function is called. The call site may pass zero or more arguments (e.g., data) to the called function. The return values, e.g., resulting data, from the called function are received at the call site.

In Example 1, each call site invoking function G passes different data to the called function. The first call site, for example, passes data A. The second call site passes data B. In Example 1, each call site also receives different resulting data from function G.

Figure 2:
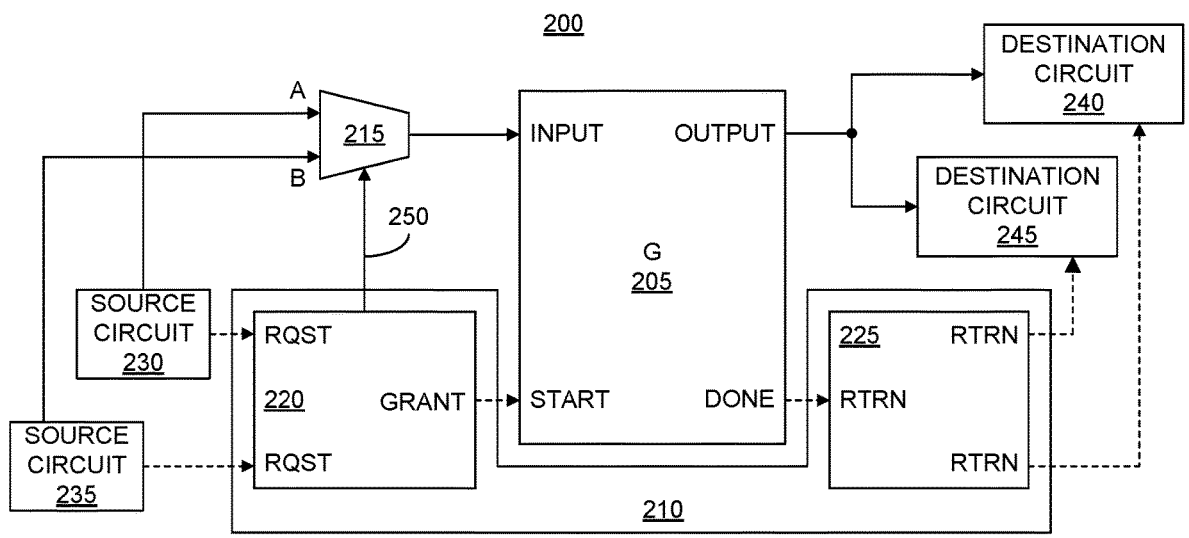
FIG. 2 illustrates an example circuit architecture generated in accordance with the inventive arrangements described herein.

FIG. 2 illustrates an example circuit architecture 200 generated in accordance with the inventive arrangements described herein. A system the same as, or similar to, system 100 described in connection with FIG. 1 is capable of generating circuit architecture 200 as a hardware implementation of the source code of Example 1. As such, circuit architecture 200 is a hardware implementation of function F of Example 1. Within this disclosure, circuit blocks represented in the various circuit architectures may represent modules of a circuit design generated by the system from the source code being processed. In this regard, the generated hardware and/or circuit architecture may be specified as one or more modules of RTL and/or other hardware description language. Further, within this disclosure, handshake signals are illustrated with dashed lines to differentiate from data signals and select signals. The arrows shown on handshake signals indicate the direction of flow control within the circuit architectures. It should be appreciated that handshake signals, as illustrated within the figures, may represent multibit and/or bidirectional signals despite the use of a directional arrow.

Circuit architecture 200 includes a circuit block 205 and multiplexer circuitry 210. Circuit block 205 is a hardware implementation of function G. In the example of FIG. 2, the system has created one instance of circuit block 205 as opposed to one instance of the circuit block for each call site invoking function G. Multiplexer circuitry 210 includes a multiplexer 215, handshake circuit 220, and handshake circuit 225.

Referring to Example 1, the source code that generates arguments A and B and the source code that consumes (e.g., operates on) results from function G is not shown. For purposes of illustration, such source code is presumed to be within function F. Within the example of FIG. 2, the circuitry that generates argument A is shown as source circuit 230. The circuitry that generates argument B is shown as source circuit 235. The circuitries that receive the results from circuit block 205 are shown as destination circuit 240 and destination circuit 245. Destination circuit 240 receives the result output from circuit block 205 from processing argument A. Destination circuit 245 receives the result output from circuit block 204 from processing argument B. Source circuit 230, source circuit 235, destination circuit 240, and destination circuit 245 are included in the module of the circuit design that implements function F.

In other embodiments, when the source code that generates arguments A and B is external to function F, the corresponding source circuitry will be implemented in a module of the circuit design other than the module implementing function F. Similarly, when the source code that consumes the result of function G is external to function F, the corresponding destination circuitry will be implemented in a module of the circuit design other than the module implementing function F.

In the example of FIG. 2, source circuit 230, source circuit 235, destination circuit 240, and destination circuit 245 are shown as separate blocks. In one or more embodiments, the source and/or destination circuit blocks shown represent data ports and handshake signal ports of the source and/or destination circuitry. In that case, source circuit 230, source circuit 235, destination circuit 240, and destination circuit 245 may represent ports of a single circuit block or ports of a plurality of different circuit blocks.

In the example of FIG. 2, circuit architecture 200 operates in a deterministic manner. For example, handshake circuit 220 is capable of communicating with corresponding handshake circuitry within each of source circuit 230 and source circuit 235. By accessing the call request (RQST) ports of handshake circuit 220, source circuit 230 and source circuit 235 each may request access to circuit block 205. In the example of FIG. 2, the order in which handshake circuit 220 grants source circuit 230 and source circuit 235 access to circuit block 205 is predetermined. For example, if each of source circuit 230 and source circuit 235 initiate handshake signaling to handshake circuit 220 to pass data to circuit block 205, handshake circuit 220 is capable of enforcing a predetermined order of access thereby allowing only one of source circuit 230 or source circuit 235 to provide data to circuit block 205 at a time based on the predetermined order.

Handshake circuit 220, in response to receiving a request from source circuit 230 or source circuit 235, based upon the predetermined ordering, is capable of providing handshake signaling to circuit block 205 to start operation of circuit block 205. Handshake signals to start operation of a circuit block may be referred to herein as "input handshake signals" from time-to-time. Handshake signals generated by a circuit block to indicate completion of processing or a done state may be referred to as "output handshake signals" from time-to-time. Handshake circuit 220 generates a signal from the grant port to the start port of circuit block 205 to start operation of circuit block 205. In addition, in granting source circuit 230 or source circuit 235 access to circuit block 205, handshake circuit 220 is capable of providing a select signal 250 to multiplexer 215 to allow correct data, e.g., argument A or argument B, to pass into circuit block 205 as input.

For example, handshake circuit 220 is capable of receiving a request to access circuit block 205 from source circuit 230. In response to the request, handshake circuit 220 determines that source circuit 230 is allowed to access circuit block 205 based upon the predetermined ordering and any prior accesses to circuit block 205. Accordingly, handshake circuit 220 provides select signal 250 to multiplexer 215 that causes multiplexer 215 to pass data, e.g., argument A, from source circuit 230 to circuit block 205 as input. In coordination with providing select signal 250 to multiplexer 215, handshake circuit 220 is capable of providing appropriate handshake signaling to circuit block 205 to start operation thereof on received argument A.

Handshake circuit 225 is capable of receiving handshake signaling from circuit block 205 indicating when processing on the received data is complete. As pictured, handshake circuit 225 has a return (RTRN) port that is coupled to the done port on circuit block 205. In response to receiving handshake signaling from circuit block 205 from the done port indicating that processing is done, handshake circuit 225 is capable of providing handshake signaling to the correct destination circuit. For example, because the order of access between source circuits to circuit block 205 is deterministic, handshake circuit 225 is capable of providing handshake signaling to the correct destination circuit without direct communication with handshake circuit 220. Circuit block 205 outputs results from operating on received input data and provides the results to both destination circuits. The correct destination circuit is able to capture the results from circuit block 205 in response to receiving handshake signals from handshake circuit 225.

Referring to the prior example where circuit block 205 operates on argument (e.g., data) A, the results from operation of circuit block 205 may be provided to destination circuit 240 and destination circuit 245. Handshake circuit 225, however, in response to receiving handshake signaling from circuit block 205, provides handshake signaling to destination circuit 240 indicating the availability of result data. Destination circuit 240, in response to receiving handshake signaling from handshake circuit 225, is capable of capturing the result data received from circuit block 205.

For purposes of illustration, circuit architecture 200 may utilize handshake signaling as implemented in one or more of the Advanced Microcontroller Bus Architecture (AMBA) eXtensible Interface (AXI) bus specifications. It should be appreciated, however, that any of a variety of known signaling protocols may be used to perform handshake signaling signifying requests for processing, start of processing, processing complete or done, and/or other notifications exchanged between circuit blocks. In another example, the control protocol may use handshake signaling to represent the start of a function (e.g., "ap_start" and "ap_ready") and the completion of a function (e.g., "ap_done" and "ap_continue").

FIG. 3 illustrates an example method 300 of HLS. Method 300 may be performed by a system the same as, or similar to, system 100 described in connection with FIG. 1. Method 300 may begin in a state where an application is selected for processing to undergo HLS. For purposes of illustration, the application includes source code the same as or similar to that described in connection with Example 1.

In block 305, the system optionally translates the application into an IR. In block 310, the system is capable of detecting a first function, e.g., F, within the application that directly calls a second function, e.g., G. Function F, for example, may include two or more call sites each invoking function G. In the example of FIG. 3, the second function is not passed to the first function as a pointer reference.

In block 315, the system is capable of determining that the call sites to the second function pass different data, e.g., arguments, to the second function. In Example 1, the first call site passes argument A to function G, while the second call site passes argument B to function G. In block 320, the system is capable of determining that the call sites to the second function each receive different result data from the second function.

In block 325, the system is capable of generating a circuit design from the application. The circuit design specifies a hardware implementation of the first function. For example, the circuit design generated by the system may have an architecture the same as, or similar to, circuit architecture 200 described in connection with FIG. 2. As such, the hardware implementation of the first function includes a circuit block (e.g., a module) implementing the second function, e.g., a single circuit block implementing the second function. Further, the hardware implementation of the first block includes multiplexer circuitry. The system is capable of generating circuitry for other program code of the application such as the call sites, consumers of results from the second function, and/or program code external to the first function (e.g., function F).

The multiplexer circuitry is configured to coordinate the passing of data, e.g., arguments and/or results, with handshake signals. For example, the multiplexer circuitry coordinates the passing of input data to the circuit block from a hardware implementation corresponding to the first call site and a hardware implementation corresponding to the second call site, with handshake signals exchanged between the circuit block and the hardware implementations of the respective call sites.

FIG. 4 illustrates an example implementation of block 325 of FIG. 3. For purposes of illustration, FIG. 4 is described with reference to Example 1 and FIG. 2.

In block 405, the system is capable of generating a first handshake circuit corresponding to handshake circuit 220. Handshake circuit 220 is configured to provide input handshake signals to circuit block 205. Handshake circuit 220 is configured to provide the input handshake signals to circuit block 205 in response to receiving handshake signals from source circuit 230 or handshake signals from source circuit 235. In the example of FIG. 4, handshake circuit 220 is configured to accept handshake signals from source circuits in a predetermined order. In this regard, handshake circuit 220 implements a deterministic system.

In block 410, the system is capable of generating a multiplexer corresponding multiplexer 215. Multiplexer 215 is configured to pass data from source circuit 230 or data from source circuit 235. Multiplexer 215 passes data from a selected source circuit in coordination with generation of the input handshake signals provided by handshake circuit 220. As noted, handshake circuit 220 is capable of coordinating operation with multiplexer 215 by providing select signal 250 to multiplexer 215.

In block 415, the system is capable of generating a second handshake circuit corresponding to handshake circuit 225. Handshake circuit 225 is capable of receiving output handshake signals from circuit block 205. In response to receiving output handshake signals from circuit block 205, handshake circuit 225 is capable of providing handshake signals to destination circuit 240 or destination circuit 245. As discussed, since the order in which circuit block 205 processes data from the various source circuits is predetermined, the predetermined ordering may be implemented within handshake circuit 225.

Figure 5:
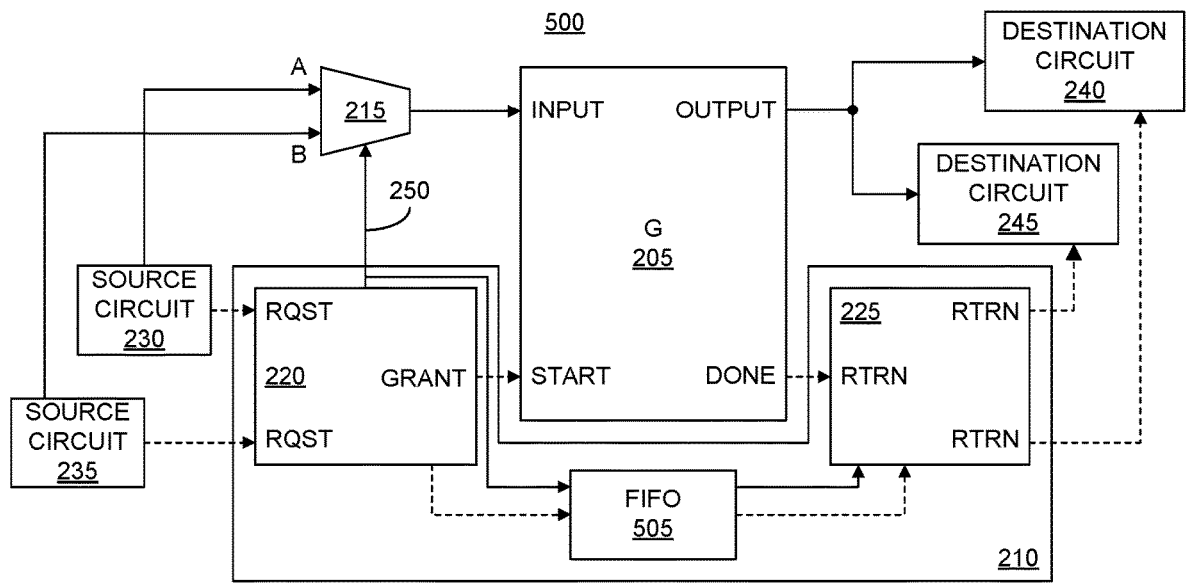
FIG. 5 illustrates another example circuit architecture generated in accordance with the inventive arrangements described herein.

FIG. 5 illustrates another example circuit architecture 500 generated in accordance with the inventive arrangements described herein. A system the same as, or similar to, system 100 described in connection with FIG. 1 is capable of generating circuit architecture 500 as a hardware implementation of the source code of Example 1. As such, circuit architecture 500 is another hardware implementation of function F of Example 1.

Circuit architecture 500 is substantially similar to circuit architecture 200 of FIG. 2. Whereas circuit architecture 200 was deterministic, circuit architecture 500 of FIG. 5 is nondeterministic. As such, the order in which data is passed from source circuit 230 and/or source circuit 235 is determined dynamically at runtime of circuit architecture 500. Using a nondeterministic approach as illustrated in FIG. 5, circuit architecture 500 is able to pass data from source circuit 230 or source circuit 235 in the order in which each respective source circuit requests processing via the handshake signals provided to handshake circuit 220.

For purposes of illustration, consider the case where source circuit 230 and source circuit 235 generate arguments A and B at different times that may not be determinable through analysis of the source code and/or the resulting circuitry of each respective call site. In that case, arbitration circuitry within handshake circuit 220 is capable of determining which source circuit requests access to circuit block 205 first. Handshake circuit 220 is capable of determining which source circuit requests access to circuit block 205 first, providing input handshake signals to circuit block 205 in response to the first received request, and providing select signal 250 that causes multiplexer 215 to pass the argument from the first requesting source circuit. Handshake circuit 220 may continue to arbitrate between requests received from source circuits and cause multiplexer 215 to pass the appropriate data in coordination with the arbitration of requests from the source circuits.

Because of the nondeterministic nature of multiplexer circuitry 210, a first-in-first-out (FIFO) memory 505 is inserted between handshake circuit 220 and handshake circuit 225. Handshake circuit 220 is capable of sending state information indicating arbitration results to FIFO memory 505 during operation of the circuit. As pictured, select signal 250 is also provided to a data input of FIFO memory 505. Handshake circuit 220 is capable of providing handshake signals to FIFO memory 505 indicating the availability of data so that FIFO memory 505 is able to receive and store the state information provided by select signal 250. The state information indicates which source circuit is receiving access to circuit block 205. The handshake signals further indicate the successful transfer to data from handshake circuit 220 to FIFO memory 505.

In the example of FIG. 5, FIFO memory 505 is capable of implementing a pipeline type of circuit architecture. FIFO memory 505, for example, accounts for latency between the time data is provided to circuit block 205 and the time results are generated by circuit block 205. FIFO memory 505 also enables multiple tasks to be pipelined through circuit block 205.

FIFO memory 505 is capable of signaling availability of data to handshake circuit 225 via the handshake signals. Accordingly, handshake circuit 225 receives the state information from FIFO memory 505. The handshake signals further indicate the successful transfer of data from FIFO memory 505 to handshake circuit 225. Based upon the state information obtained from FIFO memory 505, handshake circuit 225 is capable of providing handshake signaling to the correct destination circuit as results output from circuit block 205 are generated. With the correct handshake signaling provided by handshake circuit 225, the correct destination circuit is able to capture data generated by circuit block 205.

Architecture 500 provides an implementation option where the order in which data from call sites is processed by a called function may be determined dynamically at runtime as opposed to using a static schedule that typically follows the order in which call sites occur within the original source code. For example, rather than forcing the circuit architecture to process data from source circuit 230 prior to data from source circuit 235, architecture 500 is capable of processing data from the source circuit that first has data ready for processing and requests access to circuit block 205. Architecture 500 avoids cases where the system waits for source circuit 230 to finish generating argument A even though argument B from source circuit 235 is ready for processing.

Architecture 500 may be implemented using a process that is substantially similar to that described in connection with FIGS. 3 and 4. In generating architecture 500, however, additional processing is included where the system generates FIFO memory 505. FIFO memory 505 couples handshake circuit 220 with handshake circuit 225. Handshake circuit 220 is capable of writing write state information to FIFO memory 505. Handshake circuit 225 is capable of receiving handshake signals from circuit block 205 indicating that result data is ready. In response thereto, handshake circuit 225 reads the state information from FIFO memory 505 (e.g., in FIFO order) and provides handshake signals to the particular destination circuit indicated by the state information.

Example 1 provides source code for purposes of illustration. In this regard, the source code may include more than two call sites to function G. In such cases, the resulting circuit architectures of FIGS. 2 and/or 5 would include handshake circuits capable of accommodating the number of call sites for the called function G included in function F in the source code.

Example 2 illustrates further source code that may be processed by a system such as system 100 described in connection with FIG. 1.

Example 2

```
G(t) {
  H(t);
  H(t);
}
F( ) {
  G(X);
  G(Y);
}
```

The source code in Example 2 illustrates that function F includes two call sites to function G. Function G includes two call sites each invoking function H. Similar to Example 1, each call site invoking function H provides different data to function H. Further, each call site invoking function H receives different result data back from function H.

Figure 6:
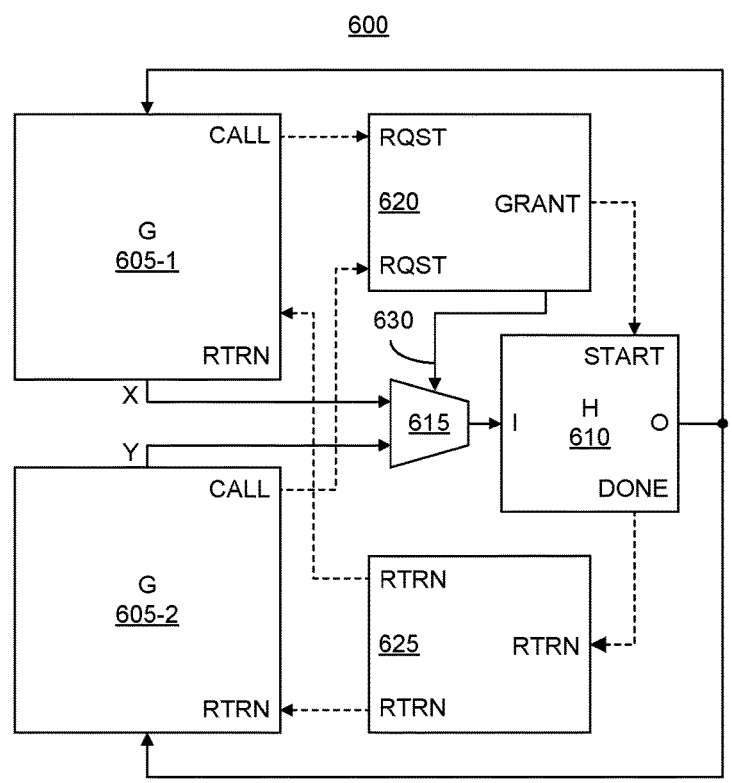
FIG. 6 illustrates another example circuit architecture generated in accordance with the inventive arrangements described herein.

FIG. 6 illustrates another example circuit architecture 600 generated in accordance with the inventive arrangements described herein. A system the same as, or similar to, system 100 described in connection with FIG. 1 is capable of generating circuit architecture 600 as a hardware implementation of the source code of Example 2.

In the example of FIG. 6, each call site invoking function G is implemented as a different instance of the circuit block. Accordingly, circuit architecture 600 includes a first hardware implementation of function G shown as circuit block 605-1 and a second hardware implementation of function G shown as circuit block 605-2. In the example of FIG. 6, circuit block 605-1 and circuit block 605-2 are identical. In one or more other embodiments, circuit block 605-1 and circuit block 602-2 are not identical (e.g., implement different functions and/or include different circuitry), though each of circuit blocks 605-1 and 605-2 implements a same function (e.g., function H). For purposes of illustration, the source and destination circuitries for circuit blocks 605-1 and 605-2 are not shown.

The system may generate an architecture as shown in FIG. 6 in cases where function G includes other operations that may be important to the operation of the resulting circuitry other than calls to function H. As such, architecture 600 parallelizes operations performed by function G. Still, a hardware implementation of function H may consume significant resources of the IC (e.g., be large and utilize a high number of components) and/or be executed less frequently than other portions of function G. As such, the system creates a single hardware implementation of function H.

As noted, function G includes multiple call sites invoking function H. In one or more embodiments, the system is capable of extracting the module implementing function H from the module implementing function G and creating a hardware implementation of function H that is external to each hardware implementation of function G. In conventional systems, the module implementing function H would be included within each instance of the module implementing function G. In the example of FIG. 6, due to the extraction, the hardware implementation of function H, represented by circuit block 610, is independent of each of circuit block 605-1 and circuit block 605-2. The architecture of FIG. 6 allows parallelization of circuit block 605 for improved performance (e.g., speed) while avoiding duplication of circuitry in circuit block 610, which may consume a large number of resources or be called infrequently. Multiplexer circuitry similar to multiplexer circuitry 210 of FIG. 2 or FIG. 5 is included to control access to circuit block 610 by each of circuit block 605-1 and 605-2. For purposes of discussion, multiplexer circuitry of FIG. 6 includes multiplexer 615, handshake circuit 620, and handshake circuit 625.

The multiplexer circuitry of FIG. 6 effectively controls access of circuit blocks 605-1 and 605-2 to circuit block 610. In the source code shown in Example 2, there may be two calls to function H for each call of function G (e.g., a total of 4 calls to function H). Circuit architecture 600 includes one circuit block implementing function H. Using circuit architecture 600, circuit block 610 performs each of the calls to function H.

In the example of FIG. 6, circuit block 605-1 provides argument X to multiplexer 615. Circuit block 605-2 provides argument Y to multiplexer 615. Circuit architecture 600 operates in a deterministic manner. For example, handshake circuit 620 is capable of communicating with corresponding handshake circuitry within each of circuit blocks 605-1 and 605-2. By accessing handshake circuit 620, circuit block 605-1 and circuit block 605-2 each may request access to circuit block 610. The order in which handshake circuit 620 grants circuit block 605-1 and circuit block 605-2 access to circuit block 610 is predetermined.

Handshake circuit 620, in response to receiving a request from circuit block 605-1 or circuit block 605-2, based upon the predetermined ordering, is capable of providing handshake signaling to circuit block 610 to start operation of circuit block 610. In addition, in granting circuit block 605-1 or circuit block 605-2 access to circuit block 610, handshake circuit 620 is capable of providing select signal 630 to multiplexer 615 to allow correct data to pass into circuit block 610 as input (e.g., at input port "I").

Handshake circuit 625 is capable of receiving handshake signaling from circuit block 610 indicating that processing on the received data is complete. In response to receiving handshake signaling from circuit block 610, handshake circuit 625 is capable of providing handshake signaling to the correct destination circuit. For example, because the order of access between source circuits to circuit block 610 is deterministic, handshake circuit 625 is capable of providing handshake signaling to the correct one of circuit block 605-1 or circuit block 605-2 in response to receiving handshake signaling from circuit block 610 indicating that processing of received data is complete. Circuit block 610 outputs results from operating on received input data and provides the result data to both circuit block 605-1 and circuit block 605-2 from the output port (e.g., output port "O"). The correct destination circuit is able to capture the result data from circuit block 610 in response to receiving handshake signals from handshake circuit 625.

Example 2 provides source code for purposes of illustration. In this regard, the source code may include more than two call sites to function G and/or more than one function that, once converted into hardware, may be extracted. In such cases, the resulting circuit architecture would include a number of instances of circuit block 605 corresponding to the number of call sites of function G. Further, the resulting circuit architecture may include more than one circuit block pulled out from hardware blocks corresponding to function G and implemented separately with each such implementation having multiplexer circuitry regulating access by hardware implementations of function G to the extracted circuit blocks.

The example of FIG. 6 presumes that arguments have been converged. For example, inside of circuit block 605-1 or circuit block 605-2, there may be two different arguments for circuit block 610. In circuit architecture 600, for example, these different arguments may be merged through multiplexing and handshake circuitry into a single data stream. Then, circuit architecture 600, as part of the module implementing function F, may merge these streams of arguments. In another example, each of circuit block 605-1 and circuit block 605-2 may produce two separate interfaces to produce the two different arguments. In that case, the arguments may be arbitrated together using a 4:1 multiplexer and associated handshake circuitry.

Figure 7:
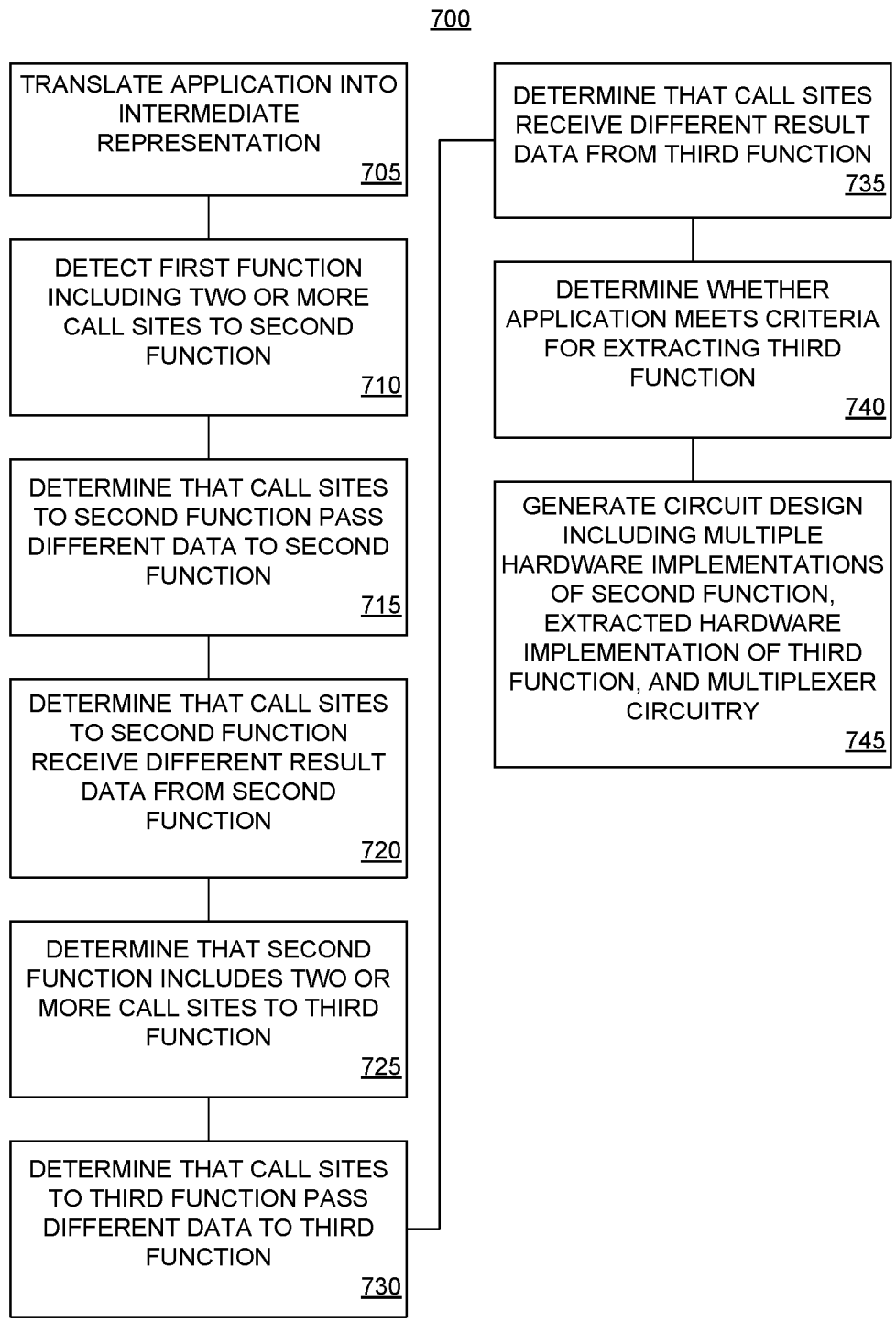
FIG. 7 illustrates another example method of HLS.

FIG. 7 illustrates another example method 700 of HLS. Method 700 may be performed by a system the same as, or similar to, system 100 described in connection with FIG. 1. Method 700 may begin in a state where an application is selected for processing to undergo HLS. For purposes of illustration, the application includes source code the same as or similar to that described in connection with Example 2.

Blocks 705-720 may be performed substantially as described in connection with FIG. 3 and, in particular, to blocks 305-320, respectively. Accordingly, in block 705, the system optionally translates the application into an IR. In block 710, the system is capable of detecting a first function, e.g., function F, within the application that includes at least two different call sites to a second function, e.g., function G. For purposes of the illustration, the second function is called directly, e.g., is not passed as a reference pointer. In block 715, the system is capable of determining that the call sites to the second function pass different data, e.g., arguments, to the second function. In block 720, the system is capable of determining that the call sites to the second function each receive different result data from the second function.

In block 725, the system is capable of determining that the second function includes two or more call sites that invoke a third function. Referring to Example 2, the system determines that function G includes two call sites to function H.

In block 730, the system is capable of determining that call sites to the third function pass different data, e.g., arguments, to the third function. Continuing with the previous examples, the system determines that each call site to function H passes different data to function H. The first call site, for example passes argument X. The second call site passes argument Y.

In block 735, the system determines that the call sites for the third function receive different result data from the third function. The system determines that the first call site and the second call site to the third function each receive different data results from function H.

In block 740, the system optionally determines whether the application meets criteria for extracting the third function. The system is capable of performing further analysis on the application to determine whether a hardware implementation of the third function should be extracted from the hardware implementation of the second function. For example, the system is capable of analyzing one or more characteristics of function G and/or function H to determine whether function G should be implemented as multiple, parallel hardware implementations and/or whether function H should be implemented as a module that is external to and/or independent of the module implementing function G as illustrated in connection with FIG. 6.

In one or more embodiments, the system is capable of profiling different functions of the application to determine the amount of time that each function contributes to runtime of the application. The amount of time that a function contributes to the runtime of the application may be characterized in terms of the number of times that the function is called during execution of the application, the amount of time the function takes to execute for each call, or both.

In cases where function G, for example, includes portions that contribute to runtime by at least a threshold amount, the system may determine that each call site to function G should be implemented by a separate and parallel hardware implementation of function G. As an illustrative and non-limiting example, the system may determine that one or more portions of function G have a runtime contribution that exceeds a threshold runtime contribution. In response to the comparison, the system may determine that such portions should be implemented in parallel in hardware.

For the third function, e.g., function H, the system is capable of comparing the runtime contribution of the function with a different threshold runtime contribution. In response to determining that the run time contribution of the third function (e.g., function H) does not exceed the threshold runtime contribution, the system may determine that circuit architecture 600 of FIG. 6 is suitable for implementing functions G and H. In that case, the system extracts the hardware block implementing function H from the hardware block implementing function G. This avoids unnecessarily duplicating the circuitry implementing function H in each circuit block implementation of function G.

By comparison, in response to determining that function H has a runtime contribution exceeding the runtime contribution threshold, the system may determine that function H does not meet the criteria for extraction and that circuit architecture 600 is not appropriate. In the latter case, the system would leave the hardware implementation of function H within each respective hardware implementation of function G.

In one or more other embodiments, the system is capable of profiling the hardware implementation(s) of the application. For example, the system is capable of determining an implementation cost of the third function. The implementation cost may be measured in terms of size of the hardware implementation of function H. The system is capable of estimating size in terms of estimated area on the target IC required to implement function H and/or the number of circuit elements of the target IC needed to implement function H. The system is capable of comparing the hardware implementation cost of function H with a threshold hardware implementation cost. In response to determining that the hardware implementation cost of function H exceeds the threshold hardware implementation cost (e.g., and that function G should be implemented in parallel per above criteria), the system is capable of determining that circuit architecture 600 is suitable for implementing functions G and H.

The criteria described herein in connection with block 740 is provided for purposes of illustration only. In other examples, the system is capable of generating multiple different circuit architectures (e.g., in RTL), simulating such architectures using a user provided test bench, comparing performance of the different circuit architectures, and selecting a particular circuit architecture for use in hardware accelerating the application.

The examples described in connection with block 740 allow the system to profile the circuit implementation of the application to determine dynamic behavior of the resulting hardware particularly in cases where performance is data dependent. Decisions to increase performance typically correlate with increased area requirements and increased resource usage on the target IC. The criteria used may maximize the likelihood that a large function H that is called relatively rarely may be implemented as illustrated in FIG. 6. Enabling greater sharing of the hardware implementation of function H can reduce the resources of the target IC that are needed.

In block 745, the system is capable of generating a circuit design that includes multiple hardware implementations of the second function, an extracted hardware implementation of the third function, and suitable multiplexer circuitry. For example, the system is capable of generating a circuit design that includes multiple hardware implementations of function G and a single hardware implementation of function H that is extracted from the hardware implementation of function G. Suitable multiplexer circuitry may be implemented that controls access to the hardware implementation of function H.

Figure 8:
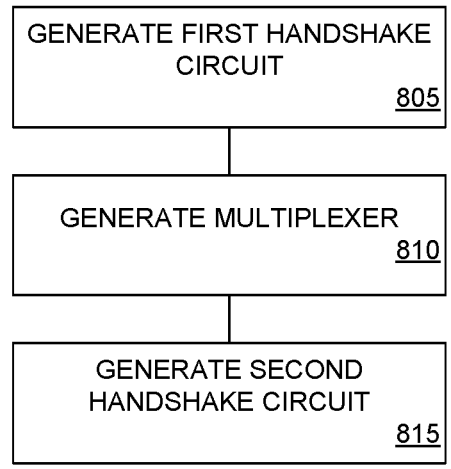
FIG. 8 illustrates an example implementation of block 745 of FIG. 7.

FIG. 8 illustrates an example implementation of block 745 of FIG. 7. For purposes of illustration, FIG. 8 is described with reference to Example 2 and FIG. 6.

In block 805, the system is capable of generating a first handshake circuit corresponding to handshake circuit 620. Handshake circuit 620 is configured to provide input handshake signals to circuit block 610. Handshake circuit 620 is configured to provide the input handshake signals to circuit block 610 in response to receiving handshake signals from circuit block 605-1 or circuit block 605-2. In the example of FIG. 6, handshake circuit 620 is configured to accept handshake signals from circuit blocks 605-1 and 605-2 in a predetermined order. In this regard, handshake circuit 620 implements a deterministic system.

In block 810, the system is capable of generating a multiplexer corresponding multiplexer 615. Multiplexer 615 is configured to pass data from circuit block 605-1 or circuit block 605-2. Multiplexer 615 passes data from a selected source circuit, e.g., circuit block 605-1 or circuit block 605-2, in coordination with generation of the input handshake signals provided by handshake circuit 620. As noted, handshake circuit 620 is capable of coordinating operation with multiplexer 615 by providing a select signal to multiplexer 615.

In block 815, the system is capable of generating a second handshake circuit corresponding to handshake circuit 625. Handshake circuit 625 is capable of receiving output handshake signals from circuit block 610. In response to receiving output handshake signals from circuit block 610 indicating that processing is done, handshake circuit 625 is capable of providing handshake signals to circuit block 605-1 or circuit block 605-2. As discussed, since the order in which handshake circuit 620 processes requests from the various call sites is predetermined, the predetermined ordering may be implemented within handshake circuit 625.

Figure 9:
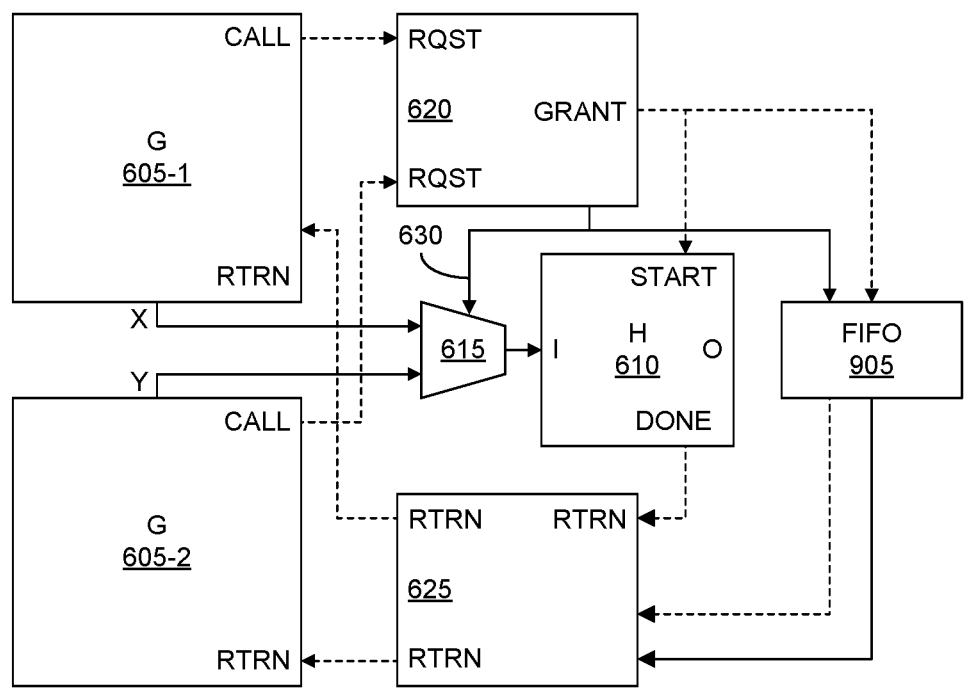
FIG. 9 illustrates another example circuit architecture generated in accordance with the inventive arrangements described herein.

FIG. 9 illustrates another example circuit architecture 900 generated in accordance with the inventive arrangements described herein. A system the same as, or similar to, system 100 described in connection with FIG. 1 is capable of generating circuit architecture 900 as a hardware implementation of the source code of Example 2 and an alternative to the example of FIG. 6.

Circuit architecture 900 is substantially similar to circuit architecture 600 of FIG. 6. Whereas circuit architecture 600 was deterministic, circuit architecture 900 of FIG. 9 is nondeterministic similar to the example of FIG. 5. As such, the order in which data is passed from circuit block 605-1 or circuit block 605-2 to circuit block 610 is determined dynamically at runtime of circuit architecture 900. Using a nondeterministic approach as illustrated in FIG. 9, circuit architecture 900 is able to pass data from circuit block 605-1 or circuit block 605-2 in the order in which each respective circuit block requests processing via the handshake signals provided to handshake circuit 620.

For purposes of illustration, consider the case where circuit block 605-1 and circuit block 605-2 generate arguments X and Y at different times that may not be determinable through analysis of the source code and/or the resulting circuitry of each respective circuit block. In that case, arbitration circuitry within handshake circuit 620 is capable of determining which circuit block requests access to circuit block 610 first. Handshake circuit 620 is capable of determining which circuit block requests access to circuit block 610 first, providing input handshake signals to circuit block 610 in response to the first received request, and providing a select signal that causes multiplexer 615 to pass the argument from the first requesting circuit block. Handshake circuit 620 may continue to arbitrate between requests received from circuit blocks and cause multiplexer 615 to pass the appropriate data in coordination with the arbitration of requests from the circuit blocks.

Because of the nondeterministic nature of the multiplexer circuitry, a FIFO memory 905 is inserted between handshake circuit 620 and handshake circuit 625. Handshake circuit 620 is capable of sending state information indicating arbitration results to FIFO memory 905 during operation of the circuit. As pictured, select signal 630 is also provided to a data input of FIFO memory 905. Handshake circuit 620 is capable of providing handshake signals to FIFO memory 905 indicating the availability of data so that FIFO memory 905 is able to receive and store the state information provided by select signal 630. The state information indicates which of circuit blocks 605-1 or 605-2 is granted access to circuit block 610 at any given time. The handshake signals further indicate the successful transfer to data from handshake circuit 620 to FIFO memory 905.

In the example of FIG. 9, FIFO memory 905 is capable of implementing a pipeline type of circuit architecture. FIFO memory 905, for example, accounts for latency between the time data is provided to circuit block 610 and the time results are generated by circuit block 610. FIFO memory 905 also enables multiple tasks to be pipelined through circuit block 610.

FIFO memory 905 is capable of signaling availability of data to handshake circuit 625 via the handshake signals. Accordingly, handshake circuit 625 receives the state information from FIFO memory 905. The handshake signals further indicate the successful transfer of data from FIFO memory 905 to handshake circuit 625. Based upon the state information read from FIFO memory 905, handshake circuit 625 is capable of providing handshake signaling to the correct circuit block as results output from circuit block 610 are generated. With the correct handshake signaling provided by handshake circuit 625, the correct circuit block is able to capture data generated by circuit block 610.

Circuit architecture 900 provides an implementation option where the order in which data from circuit blocks is processed by a hardware implementation of a called function may be determined dynamically at runtime as opposed to using a static schedule that typically follows the order in which call sites occur within the original source code. For example, rather than forcing the circuit architecture to process data from circuit block 605-1 prior to data from circuit block 605-2, architecture 900 is capable of processing data from the circuit block that first has data ready for processing and requests access to circuit block 610. Architecture 900 avoids cases where the system waits for circuit block 605-1 to finish generating argument X even though argument Y from circuit block 605-2 is ready for processing.

Circuit architecture 900 may be implemented using a process that is substantially similar to that described in connection with FIGS. 7 and 8. In generating circuit architecture 900, however, additional processing is included where the system generates FIFO memory 905. FIFO memory 905 couples handshake circuit 620 with handshake circuit 625. Handshake circuit 620 is capable of writing state information to FIFO memory 905. For example, handshake circuit 625 is capable of receiving handshake signals from circuit block 610 indicating that result data is ready. In response thereto, handshake circuit 625 reads state information from FIFO memory 905 (e.g., in FIFO order) and provides handshake signals to the particular circuit block indicated by the state information.

The system may generate an architecture as shown in FIG. 9 in cases where function G includes other operations that may be important to the operation of the resulting circuitry other than calls to function H. As such, architecture 900 parallelizes operations performed by function G. Still, a hardware implementation of function H may consume significant resources of the IC (e.g., be large and utilize a high number of components) and/or be executed less frequently than other portions of function G as described in connection with FIG. 7. As such, the system creates a single hardware implementation of function H.

Example 3 illustrates source code that may be processed by a system such as system 100 described in connection with FIG. 1. The source code of Example 3 may be part of an application such as application 135 of FIG. 1.

Example 3

```
F(INT (*H) (INT)) {
    H(X);
    H(Y);
}
```

The source code of Example 3 illustrates a case where the implementation of a particular function, e.g., function H, is not known. Function H is passed using a pointer syntax (e.g., a reference pointer) in the C programming language. In this example, function H is not called directly. Conventional HLS systems are unable to process the structure illustrated in Example 3.

Figure 10:
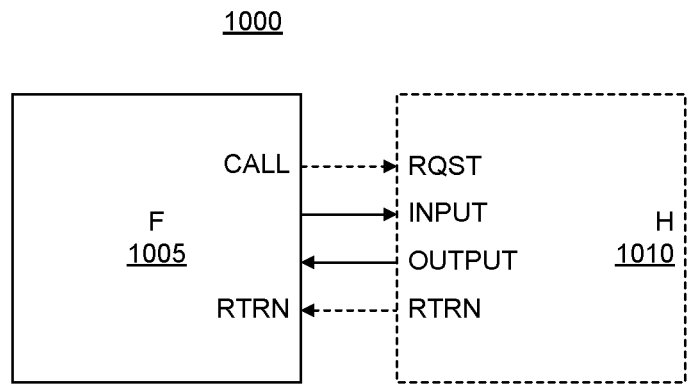
FIG. 10 illustrates another example circuit architecture generated in accordance with the inventive arrangements described herein.

FIG. 10 illustrates another example circuit architecture 1000 generated in accordance with the inventive arrangements described herein. A system the same as, or similar to, system 100 described in connection with FIG. 1 is capable of generating circuit architecture 1000 as a hardware implementation of the source code of Example 3. As such, circuit architecture 1000 is another hardware implementation of function F of Example 1.

In the example of FIG. 10, the system has created a circuit block 1005 corresponding to function F. The system further may create an empty module 1010 that is reserved for including circuitry corresponding to function H once function H is created and/or defined. In the example of FIG. 10, the system creates external handshake signals that extend outside of circuit block 1005 in order to pass control to the circuit block that will implement function H.

Circuit architecture 1000 may be used by the system in cases where implementation of a function is not available. In the example of FIG. 10, the system exposes the call/return interface at the top-level module of the circuit design, thereby enabling integration with, and control of, other hardware accelerators. An implementation of module 1010 corresponding to function H may be linked to the circuit design, e.g., circuit block 1005, after the fact.

FIG. 10 illustrates an example where there is a single implementation of function H. In one or more other embodiments, the source code may have different call sites of function F that pass different pointers (e.g., to different functions beyond function H) to function F. In such cases, the circuit implementations of the call sites may pass state data to circuit block 1005 that indicates which hardware implementation of function H to invoke. In another example, control logic external to circuit block 1005 may be provided with state data and determine which implementation of function H to invoke on behalf of circuit block 1005.

Figure 11:
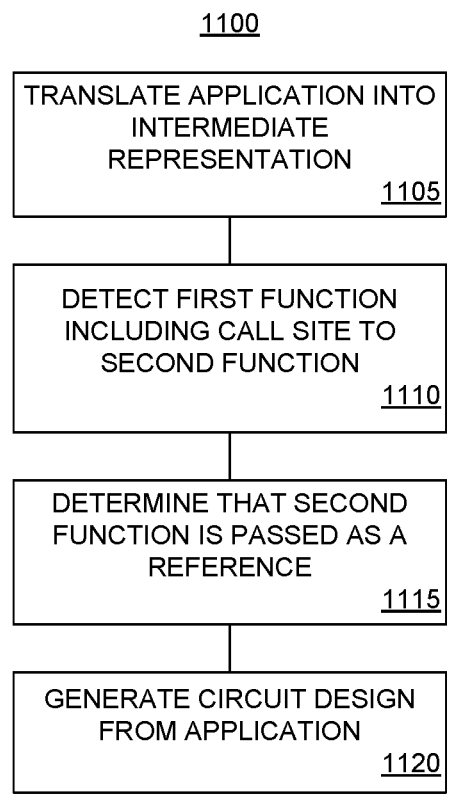
FIG. 11 illustrates another example method of HLS.

FIG. 11 illustrates another example method 1100 of HLS. Method 1100 may be performed by a system the same as, or similar to, system 100 described in connection with FIG. 1. Method 1100 may begin in a state where an application is selected for processing to undergo HLS. For purposes of illustration, the application includes source code the same as or similar to that described in connection with Example 3.

In block 1105, the system optionally translates the application into an IR. In block 1110, the system is capable of detecting a first function including a first call site for a second function. In block 1115, the system is capable of determining that the second function is passed to the first function as a reference, e.g., as a function pointer. In block 1120, the system is capable of generating a circuit design from the application including a circuit block implementing the first function. The circuit block is configured to provide handshake signals from the circuit block to a module corresponding to the second function. The module corresponding to the second function is implemented in the circuit design external to the circuit block.

Figure 12:
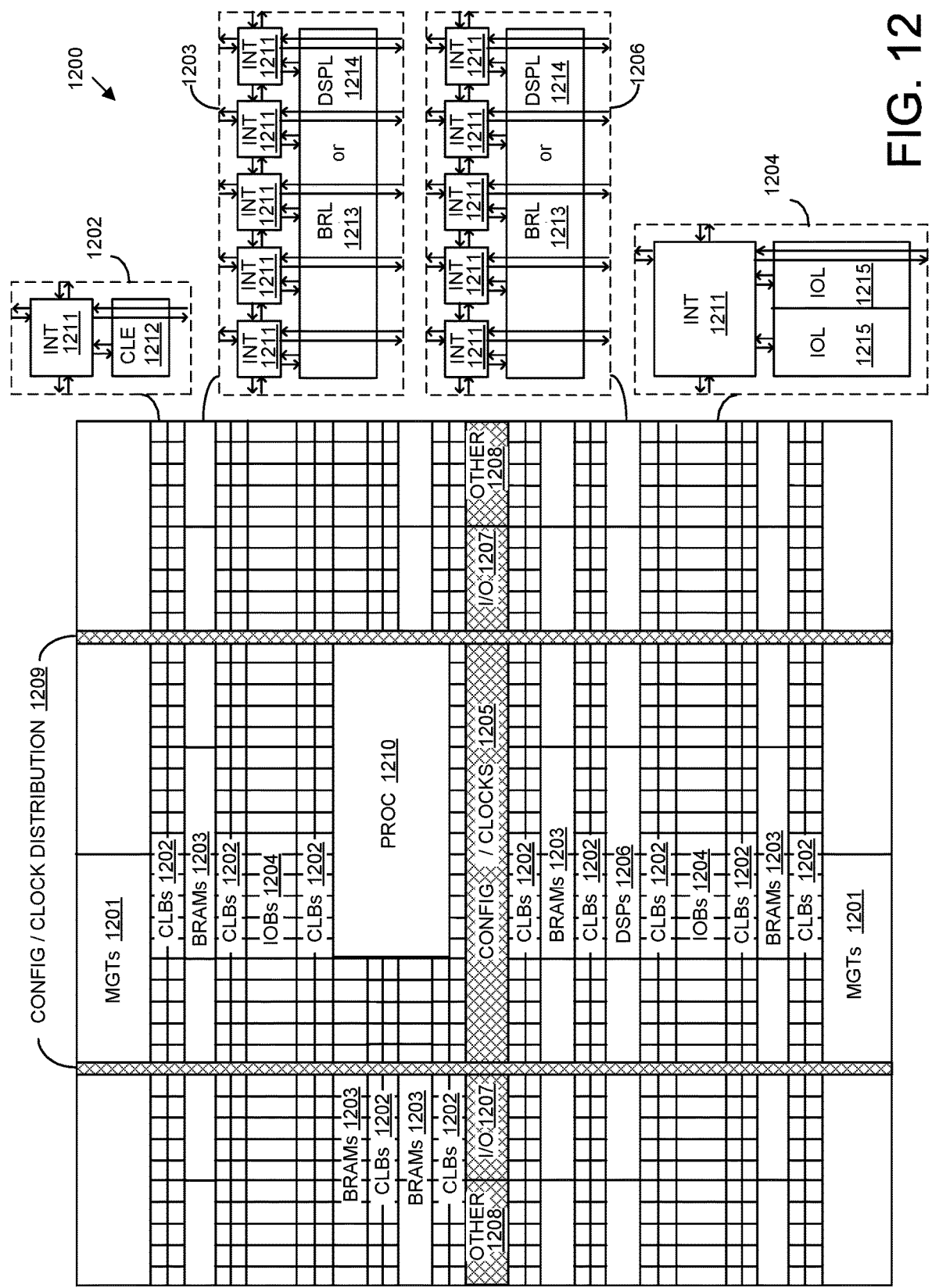
FIG. 12 illustrates an example architecture for an integrated circuit (IC).

FIG. 12 illustrates an example architecture 1200 for an IC. In one aspect, architecture 1200 may be implemented within a programmable IC. For example, architecture 1200 may be used to implement a field programmable gate array (FPGA). Architecture 1200 may also be representative of a system-on-chip (SOC) type of IC. An SOC is an IC that includes a processor that executes program code and one or more other circuits. The other circuits may be implemented as hard-wired circuitry, programmable circuitry, and/or a combination thereof. The circuits may operate cooperatively with one another and/or with the processor.

As shown, architecture 1200 includes several different types of programmable circuit, e.g., logic, blocks. For example, architecture 1200 may include a large number of different programmable tiles including multi-gigabit transceivers (MGTs) 1201, configurable logic blocks (CLBs) 1202, random access memory blocks (BRAMs) 1203, input/output blocks (IOBs) 1204, configuration and clocking logic (CONFIG/CLOCKS) 1205, digital signal processing blocks (DSPs) 1206, specialized I/O blocks 1207 (e.g., configuration ports and clock ports), and other programmable logic 1208 such as digital clock managers, analog-to-digital converters, system monitoring logic, and so forth.

In some ICs, each programmable tile includes a programmable interconnect element (INT) 1211 having standardized connections to and from a corresponding INT 1211 in each adjacent tile. Therefore, INTs 1211, taken together, implement the programmable interconnect structure for the illustrated IC. Each INT 1211 also includes the connections to and from the programmable logic element within the same tile, as shown by the examples included at the top of FIG. 12.

For example, a CLB 1202 may include a configurable logic element (CLE) 1212 that may be programmed to implement user logic plus a single INT 1211. A BRAM 1203 may include a BRAM logic element (BRL) 1213 in addition to one or more INTs 1211. Typically, the number of INTs 1211 included in a tile depends on the height of the tile. As pictured, a BRAM tile has the same height as five CLBs, but other numbers (e.g., four) also may be used. A DSP tile 1206 may include a DSP logic element (DSPL) 1214 in addition to an appropriate number of INTs 1211. An 10B 1204 may include, for example, two instances of an I/O logic element (IOL) 1215 in addition to one instance of an INT 1211. The actual I/O pads connected to IOL 1215 may not be confined to the area of IOL 1215.

In the example pictured in FIG. 12, a columnar area near the center of the die, e.g., formed of regions 1205, 1207, and 1208, may be used for configuration, clock, and other control logic. Horizontal areas 1209 extending from this column may be used to distribute the clocks and configuration signals across the breadth of the programmable IC.

Some ICs utilizing the architecture illustrated in FIG. 12 include additional logic blocks that disrupt the regular columnar structure making up a large part of the IC. The additional logic blocks may be programmable blocks and/or dedicated circuitry. For example, a processor block depicted as PROC 1210 spans several columns of CLBs and BRAMs.

In one aspect, PROC 1210 may be implemented as dedicated circuitry, e.g., as a hardwired processor, that is fabricated as part of the die that implements the programmable circuitry of the IC. PROC 1210 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1210 may be omitted from architecture 1200 and replaced with one or more of the other varieties of the programmable blocks described. Further, such blocks may be utilized to form a "soft processor" in that the various blocks of programmable circuitry may be used to form a processor that can execute program code as is the case with PROC 1210.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 12 that are external to PROC 1210 such as CLBs 1202 and BRAMs 1203 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1210.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 1210 or a soft processor. In some cases, architecture 1200 includes a dedicated configuration processor that loads the configuration bitstream to the appropriate configuration memory and/or processor memory. The dedicated configuration processor does not execute user-specified program code. In other cases, architecture 1200 may utilize PROC 1210 to receive the configuration bitstream, load the configuration bitstream into appropriate configuration memory, and/or extract program code for execution.

FIG. 12 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 12 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1210 within the IC are for purposes of illustration only and are not intended as limitations.

A system as described herein in connection with FIG. 1, for example, is capable of further processing a circuit design having undergone the processing described herein for implementation within an IC having an architecture the same as or similar to that of FIG. 12. The system, for example, is capable of synthesizing, placing, and routing the circuit design. The system may also perform bitstream generation so that the bitstream may be loaded into the IC, thereby physically implementing the circuit design within the IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method of HLS may include detecting, in an application, using computer hardware, a first function including a first call site for a second function and a second call site for the second function, determining, using the computer hardware, that the first call site and the second call site each pass different data to the second function and each receive different return data from the second function, and generating, using the computer hardware, a circuit design from the application including a circuit block implementing the second function and multiplexer circuitry. The multiplexer circuitry may be configured to coordinate passing of data to the circuit block from a first source circuit corresponding to the first call site and a second source circuit corresponding to the second call site, with handshake signals exchanged between the circuit block, the first source circuit, and the second source circuit.

In one aspect, the method may include translating the application into an intermediate representation, wherein the computer hardware performs the determining and generating using the intermediate representation.

In another aspect, the generating the circuit design may include generating a first handshake circuit configured to provide input handshake signals to the circuit block in response to receiving first handshake signals from the first source circuit or second handshake signals from the second source circuit.

In another aspect, the generating the circuit design may include generating a multiplexer circuit configured to pass data from the first source circuit or the second source circuit in coordination with the input handshake signals provided to the circuit block.

In another aspect, the generating the circuit design may include generating a second handshake circuit configured to provide third handshake signals to a first destination circuit or fourth handshake signals to a second destination circuit in response to receiving output handshake signals from the circuit block.

In another aspect, the generating the circuit design may include including a FIFO memory coupling the first handshake circuit with the second handshake circuit, wherein the FIFO memory is configured to share state of the first handshake circuit with the second handshake circuit.

In another aspect, the handshake signals are non-deterministic.

In another aspect, the handshake signals are deterministic.

In one or more embodiments, a method of HLS may include detecting, in an application, using computer hardware, a first function including a first call site for a second function and a second call site for the second function, determining, using the computer hardware, that the first call site and the second call site each pass different data to the second function and each receive different return data from the second function, and determining, using the computer hardware, that the second function includes a third function. The method may also include generating, using the computer hardware, a circuit design from the application, wherein the circuit design includes a first circuit block implementing the second function, a second circuit block implementing a further instance of the second function, a third circuit block implementing the third function, and multiplexer circuitry. The third circuit block may be implemented independently of the first circuit block and the second circuit block. The multiplexer circuitry may be configured to coordinate passing of data to the third circuit block from the first circuit block and the second circuit block with handshake signals exchanged between the first circuit block, the second circuit block, and the third circuit block.

In one aspect, the generating the circuit design may include generating a first handshake circuit configured to provide input handshake signals to the third circuit block in response to receiving first handshake signals from the first circuit block or second handshake signals from the second circuit block.

In another aspect, the generating the circuit design may include generating a multiplexer circuit configured to pass data from the first circuit block or the second circuit block in coordination with the input handshake signals provided to the third circuit block.

In another aspect, the generating the circuit design may include generating a second handshake circuit configured to provide third handshake signals to the first circuit block or fourth handshake signals to the second circuit block in response to receiving output handshake signals from the third circuit block.

In another aspect, the generating the circuit design is performed in response to determining that a runtime contribution of the third function to runtime of the application exceeds a threshold runtime contribution.

In another aspect, the generating the circuit design is performed in response to determining that a frequency of use of the third function is below a threshold frequency of use.

In another aspect, the handshake signals are non-deterministic.

In another aspect, the handshake signals are deterministic.

In another aspect, the third function is called directly by the second function.

In one or more embodiments, a method of HLS may include detecting in an application, using computer hardware, a first function including a first call site for a second function, determining, using the computer hardware, that the second function is passed to the first function as a reference, and generating, using the computer hardware, a circuit design from the application including a circuit block implementing the first function. The circuit block may be configured to provide handshake signals from the circuit block to a module corresponding to the second function.

In one aspect, the module corresponding to the second function is implemented in the circuit design external to the circuit block.

In another aspect, the reference is a function pointer.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of high level synthesis, comprising:
    detecting, in an application, using computer hardware, a first function including a first call site for a second function and a second call site for the second function;
    determining, using the computer hardware, that the first call site and the second call site each pass different data to the second function and each receive different return data from the second function; and
    generating, using the computer hardware, a circuit design from the application including a circuit block implementing the second function and multiplexer circuitry;
    wherein the multiplexer circuitry is configured to coordinate passing of data to the circuit block from a first source circuit corresponding to the first call site and a second source circuit corresponding to the second call site, with handshake signals exchanged between the circuit block, the first source circuit, and the second source circuit.

2. The method of claim 1, further comprising:
    translating the application into an intermediate representation, wherein the computer hardware performs the determining and generating using the intermediate representation.

3. The method of claim 1, wherein the generating the circuit design comprises:
    generating a first handshake circuit configured to provide input handshake signals to the circuit block in response to receiving first handshake signals from the first source circuit or second handshake signals from the second source circuit.

4. The method of claim 3, wherein the generating the circuit design comprises:
    generating a multiplexer circuit configured to pass data from the first source circuit or the second source circuit in coordination with the input handshake signals provided to the circuit block.

5. The method of claim 4, wherein the generating the circuit design comprises:
    generating a second handshake circuit configured to provide third handshake signals to a first destination circuit or fourth handshake signals to a second destination circuit in response to receiving output handshake signals from the circuit block.

6. The method of claim 5, wherein the generating the circuit design comprises:
    including a first-in-first-out memory coupling the first handshake circuit with the second handshake circuit, wherein the first-in-first-out memory is configured to share state of the first handshake circuit with the second handshake circuit.

7. The method of claim 1, wherein the handshake signals are non-deterministic.

8. The method of claim 1, wherein the handshake signals are deterministic.

9. A method of high level synthesis, comprising:
    detecting in an application, using computer hardware, a first function including a first call site for a second function and a second call site for the second function;
    determining, using the computer hardware, that the first call site and the second call site each pass different data to the second function and each receive different return data from the second function;
    determining, using the computer hardware, that the second function includes a third function;
    generating, using the computer hardware, a circuit design from the application, wherein the circuit design includes a first circuit block implementing the second function, a second circuit block implementing a further instance of the second function, a third circuit block implementing the third function, and multiplexer circuitry;
    wherein the third circuit block is implemented independently of the first circuit block and the second circuit block; and
    wherein the multiplexer circuitry is configured to coordinate passing of data to the third circuit block from the first circuit block and the second circuit block with handshake signals exchanged between the first circuit block, the second circuit block, and the third circuit block.

10. The method of claim 9, wherein the generating the circuit design comprises:
    generating a first handshake circuit configured to provide input handshake signals to the third circuit block in response to receiving first handshake signals from the first circuit block or second handshake signals from the second circuit block.

11. The method of claim 10, wherein the generating the circuit design comprises:
    generating a multiplexer circuit configured to pass data from the first circuit block or the second circuit block in coordination with the input handshake signals provided to the third circuit block.

12. The method of claim 11, wherein the generating the circuit design comprises:
    generating a second handshake circuit configured to provide third handshake signals to the first circuit block or fourth handshake signals to the second circuit block in response to receiving output handshake signals from the third circuit block.

13. The method of claim 9, wherein the generating the circuit design is performed in response to determining that a runtime contribution of the third function to runtime of the application exceeds a threshold runtime contribution.

14. The method of claim 9, wherein the generating the circuit design is performed in response to determining that a frequency of use of the third function is below a threshold frequency of use.

15. The method of claim 9, wherein the handshake signals are non-deterministic.

16. The method of claim 9, wherein the handshake signals are deterministic.

17. The method of claim 9, wherein the third function is called directly by the second function.

18. A method of high level synthesis, comprising:
  detecting, in an application, using computer hardware, a first function including a first call site for a second function;
  determining, using the computer hardware, that the second function is passed to the first function as a reference;
  generating, using the computer hardware, a circuit design from the application including a circuit block implementing the first function;
  generating an empty module reserved for circuitry corresponding to the second function;
  wherein the circuit block is configured to provide handshake signals from the circuit block to the empty module.

19. The method of claim 18, wherein the empty module corresponding to the second function is implemented in the circuit design external to the circuit block.

20. The method of claim 18, wherein the reference is a function pointer.

\* \* \* \* \*